United States Patent Office

3,433,661
Patented Mar. 18, 1969

3,433,661
PLASTICIZER COMPOSITIONS CONSISTING OF POLYNUCLEAR AROMATIC COMPOUNDS
Ronald C. Maggart, Scotch Plains, and Don H. Rotenberg, Elizabeth, N.J., and Raymond L. Heinrich, Baytown, Tex., assignors to Esso Research and Engineering Company, a corporation of Delaware
No Drawing. Continuation-in-part of application Ser. No. 374,187, June 10, 1964. This application Apr. 9, 1965, Ser. No. 447,077
U.S. Cl. 106—316      8 Claims
Int. Cl. C08f 45/28, 45/36

ABSTRACT OF THE DISCLOSURE

Hydrocarbons and ester products of the reaction of aromatic hydrocarbons, formaldehyde and a monocarboxylic acid serve as stain-resistant primary and secondary plasticizers for rigid resins such as polyvinylchloride.

---

This invention relates to a new class of materials that are particularly effective as plasticizers for resins and rubbery materials. More particularly, it concerns rigid resins plasticized with esters of complex hydrocarbon alcohols or mixtures of these esters and complex hydrocarbons.

This application is a continuation-in-part of copending patent applications Ser. No. 374,187, filed June 10, 1964 now abandoned.

The use of esters as plasticizers for polymeric resins and rubber-like materials has been known for some time. The choice of plasticizer depends mainly on the polymer and the purpose for which the plasticized resin or rubber is to be used.

In general the plasticizer must (1) be compatible with the polymeric resin or rubber, (2) must soften or flexibilize the composition, and (3) should be retained in the composition under a variety of conditions, including high temperatures.

Of particular importance under some service conditions, the pluasticized compositions should have a good resistance to staining. This is especially so for flooring compounds based upon vinyl chloride polymers and copolymers, that are susceptible to staining under ordinary traffic conditions when ordinary plasticizers are used. The plasticizer used in flooring compositions is largely responsible for whether the ultimate composition will be susceptible to staining.

It has now been discovered that certain complex esters prepared from aromatic hydrocarbons, formaldehyde, and monocarboxylic acids when used alone or in combination with complex hydrocarbons simultaneously produced are outstanding plasticizers for rigid polymeric materials, especially polyvinyl compounds, i.e. various vinyl homopolymers of vinyl chloride, vinyl acetate, vinylidene chloride; copolymers of vinyl chloride with up to 20 wt. percent vinyl acetate; polyvinyl butyral and other polyvinyl acetals; cellulose derivatives, such as cellulose acetate and ethyl cellulose; and natural and synthetic rubbers, such as butyl rubber and styrene-butadiene rubber. Furthermore, when used as plasticizers in vinyl flooring the complex esters or ester-hydrocarbon mixtures, prepared as described above, exhibit good strain resistance superior to that exhibited by plasticizing esters that are commonly used in the art.

In general, the complex esters of the present invention are prepared by reacting a suitable aromatic hydrocarbon with formaldehyde and an aromatic or aliphatic monocarboxylic acid, in approximately equal molar ratios, at elevated temperatures in the presence of acidic catalysts. An excess of any one of the reactants may be utilized to improve the yield, shorten the reaction time or regulate the composition of the product.

Suitable aromatic hydrocarbons useful for the preparation of the stain-resistant plasticizers of the invention may be represented by the following formula:

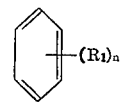

wherein $R_1$ is a $C_1$ to $C_{20}$, preferably a $C_1$ to $C_8$, hydrocarbon radical that can be either alkyl, aryl or aralkyl and $n$ varies from 0 to 4. In a given aromatic hydrocarbon if $n$ is greater than one, the value of $R_1$ may be the same or a different hydrocarbon moiety. In general, $R_1$ is a straight or branched-chain alkyl group containing 1 to 5 carbon atoms. Particularly preferred for use herein are alkyl-substituted aromatics such as toluene, ortho-, meta-, and para-xylene, ethylbenzene, dibutylbenzene, etc.; however, materials such as ditolymethane and benzene may be used with equal facility.

The acids suitable for the plasticizer synthesis can be represented by the following formula:

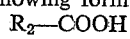

$$R_2\text{—COOH}$$

wherein $R_2$ is a $C_1$ to $C_{20}$, preferably a $C_1$ to $C_8$, hydrocarbon radical that may be either alkyl, aryl or aralkyl.

Examples of specific carboxylic acids that are suitable for use in the invention include: acetic acid, butyric acid, 2-ethyl hexanoic acid, lauric acid, benzoic acid, toluic acid and the like.

Formaldehyde may be employed in any of its conventional forms such as paraformaldehyde, trioxane, and gaseous formaldehyde.

The catalysts used to promote the condensation of the aromatic hydrocarbons, monocarboxylic acid, and formaldehyde may be of any suitable type. Conventional acidic catalysts such as aqueous solutions of concentrated sulfuric acid, perchloric acid, phosphoric acid and hydrochloric acid, as well as the cationic types of ion exchange resins can be used. Additionally, other Lewis acids as defined, for example in "Inorganic Chemistry" by T. Moeller, John Wiley & Sons, 1952, pp. 326–327, such as zinc chloride and stannic chloride can also be used to catalyze the condensation reaction. Aqueous sulfuric acid, having a concentration from 10 to 100 wt. percent more desirably from 60 to 80 wt. percent is the preferred reaction catalyst. The amount of sulfuric acid solution present in the reaction zone can vary from 0.01 to 1 mole per mole of aromatic hydrocarbon reactant. Preferably, the sulfuric acid concentration in the reaction zone is maintained at about 0.1 to 0.3 mole per mole of hydrocarbon reactant.

Preferably, the reaction for the formation of the desired ester and hydrocarbon products is carried out at a temperature in the range of from about 50 to 100° C., and still more preferably at about 100° C. The broad temperature operating range is generally between about 20° C. up to the reflux temperature of the reaction mixture. The pressure at which the condensation reaction is carried out is not critical. Good results are obtained when the reaction is conducted at atmospheric pressure, although pressures can be used ranging from less than 1 atmosphere to 100 atmosphere, preferably from about 0.5 to 10 atmospheres. The reaction time can be varied over a wide range. Reaction times ranging from 1 to 48 hours, preferably from about 2 to 10 hours, are suitable to obtain appreciable yields.

When the reaction is complete, it is desirable to separate the organic product from the aqueous phase and water-wash the product. The aqueous phase generally contains appreciable amounts of the carboxylic acid reactant. This acid can be removed from the aqueous phase by extracting the total mixture with the aromatic hydrocarbon reactant. The aromatic extract containing unreacted carboxylic acid may then be recycled to the process reactor. Toluene is a highly effective extractant for the removal of acetic acid from an aqueous acidified medium. Low boiling materials such as the mono-nuclear reactants can then be removed by heating under vacuum (vacuum stripping). The product, after heating under vacuum, consists of a mixture of the complex esters and hydrocarbons of this invention as well as minor amounts of higher boiling constituents. Specific esters or hydrocarbons may be isolated from the total mixture by vacuum distillation techniques. As small amounts of the alcohols corresponding to the esters are also formed in the condensation reaction, it may be desirable to esterify these alcohols with the same carboxylic acid employed in the main condensation reaction.

The esters of complex hydrocarbon alcohols and the complex hydrocarbons that are within the scope of the present invention and are formed by the reaction enunciated above can be represented by the following general formulae:

I
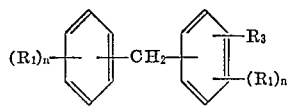

II
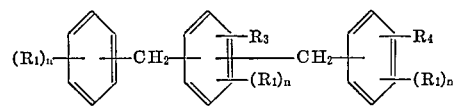

wherein $R_3$ and $R_4$ can either be a hydrogen radical or a $-CH_2OCOR_2$ radical. The values of $R_1$, $R_2$, and $n$ have been previously set forth. The principal ester products of this invention are monoesters, the ester radical being located on either a terminal or internal aromatic group.

In the preferred reaction, wherein the aromatic hydrocarbon is toluene, the formaldehyde is paraformaldehyde, and the carboxylic acid is acetic acid, the following major active plasticizer products are obtained:

previously, minor amounts (up to 35 wt. percent) of heavy products containing four or more aromatic groups formed in the process can be present in the above mixtures without materially altering the plasticizing qualities of the mixture.

The plasticizer compounds of this invention may be used alone or in combination with other known plasticizers. The quantity of plasticizer employed will depend to some extent on the end use of the resin, i.e., whether it is to be used to coat electric wires, as cable sheathings, floor tile applications, etc. It will also depend upon the quantity of filler in the composition if filler is present.

Broadly speaking, a typical resin composition should contain at least about 10 parts by weight and not more than about 70 parts by weight plasticizer, per 100 parts by weight resin, although in some instances as much as 100 parts by weight of the plasticizer composition per 100 parts of resin can be used. In floor tile applications, the amount of plasticizer present in the tile usually varies from about 10 to 60 parts of plasticizer per 100 parts of resin. It is more common, however, that about 20 to 30 parts of plasticizer per 100 parts of resin is used in floor tile applications.

In addition to the plasticizer, the polymer compositions may also contain small amounts, i.e., up to about 15 parts by weight per 100 parts of polymer, of conventional heat and light stabilizers, such as barium-cadmium salts, lead salts, phosphites, and organic epoxides; ultraviolet light absorbers; softeners; lubricant; curing agents; and pigments. The compositions may also contain up to 500 more generally 300 parts of fillers, such as calcium carbonate, clay, asbestos and quartz per 100 parts of polymer.

The invention is further illustrated by the following examples:

Example 1

Into a stirred mixture consisting of 1 mole of toluene, 1 mole of paraformaldehyde and approximately 1 mole of glacial acetic acid was added slowly over a three-hour period, 0.2 mole of sulfuric acid as a 70 wt. percent aqueous solution. During the addition of the acid solution, the reactants were maintained at a temperature of 100° C. After the completion of the addition of the acid catalyst, the mixture was allowed to react for an additional 4.5

| Product | Formula | $R_1$ | $R_2$ | $R_3$ | $R_4$ | "$n$" |
|---|---|---|---|---|---|---|
| Dinuclear hydrocarbon (ditolylmethane). | I | —CH$_3$ | | —H | | 1 |
| Dinuclear ester (ditolylmethane-methylol acetate). | I | —CH$_3$ | —CH$_3$ | —CH$_2$OCOR$_2$ | | 1 |
| Trinuclear hydrocarbon [(alpha-xylyl)-ditolylmethane]. | II | —CH$_3$ | | —H | —H | 1 |
| Trinuclear ester [(alpha-xylyl)-ditolylmethanemethylol acetate]. | II | —CH$_3$ | —CH$_3$ | —H | —CH$_2$OCOR$_2$ | 1 |
| | II | —CH$_3$ | —CH$_3$ | —CH$_2$OCOR$_2$ | —H | 1 |

The dinuclear and trinuclear monoesters formed by the condensation of toluene, paraformaldehyde and acetic acid can be used alone or in combination as highly efficient primary plasticizers. Additionally, primary plasticizing can be achieved by the use of ester-hydrocarbon mixtures wherein the mixture contains at least 20 wt. percent, preferably 30 to 40 wt. percent of either the di- or trinuclear ester or mixtures of the di- and trinuclear esters. Compositions containing at least 20 wt. percent of a mixture of di- and trinuclear esters in conjunction with di- and trinuclear hydrocarbons and the heavy residual products containing more than three aromatic groups per molecule are highly effective plasticizers. Furthermore, compositions consisting of at least 20 wt. percent of a mixture of di- and trinuclear esters in combination with trinuclear hydrocarbons and heavy residual products are also efficient plasticizers. The hydrocarbons alone are not suitable as primary plasticizers. As stated hours with stirring. Following the reaction period, the mixture was cooled to room temperature and the acid phase was separated from the organic product. The product was then neutralized with sodium bicarbonate and washed with water. The reaction mixture was then stripped of unreacted toluene and lower condensates by heating the presence of sodium bicarbonate to a vapor temperature of about 200° C. at 20 mm. Hg pressure, to obtain as a bottoms product a mixture of esters and hydrocarbons in a 35 to 40% yield.

The stripped reaction mixture was then analyzed to determine the composition of the mixture. In this analysis, the major components of the mixture were separated by chromatography (alumina column) in conjunction with vacuum fractional distillation. These components were then identified by a variety of analytical techniques, including chemical and infrared analysis.

The mixture was found to contain about 35 wt. percent of a series of isomers of a dinuclear monoester boiling in the range of about 225–235° C. at 20 mm. Hg pressure having the following general formula:

(A)
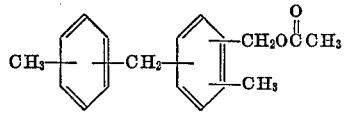

Ditolylmethanemethylol acetate

The mixture also contained about 20 wt. percent of isomers of a trinuclear hydrocarbon having the following general formula:

(B)
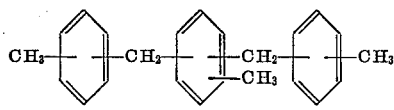

(α-xylyl)-ditolylmethane

The mixture also contained about 10 wt. percent of isomers of a trinuclear monoester having the ester radical located either on a terminal or internal aromatic group, with the following general formula:

(C)
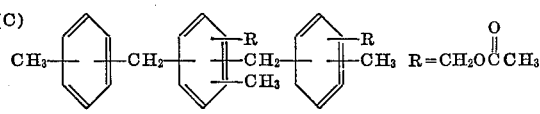

(α-xylyl)-ditolylmethanemethylol acetate

The remainder of the reaction product consisted primarily of higher molecular weight esters and hydrocarbons having at least four aromatic groups per molecule. Small amounts of alcohols corresponding to the above esters were also detected. There were also indications that diester or monoester-monoalcohol components were present in small amounts. Some ether-containing components were found as well. The various ester and hydrocarbon components useful as primary and secondary plasticizers can be separated from the reaction mixture using fractional distillation.

The effectiveness of the novel esters and ester/hydrocarbon mixtures of this invention as plasticizers, and in particular as stain-resistant plasticizers, is shown in the examples below wherein a commercial polyvinyl chloride homopolymer known as Geon 101–EP was chosen as an illustrative material.

Example 2

To demonstrate the properties of the plasticizers of this invention, the materials prepared in Example 1, namely, (α-xylyl)-ditolylmethane and ditolylmethanemethylol acetate derived from the reaction mixture as well as a mixture of 35 wt. percent of ditolylmethanemethylol acetate, 20 wt. percent (α-xylyl)-ditolylmethane, 10 wt. percent (α-xylyl)-ditolylmethanemethylol acetate, and the remainder higher molecular weight esters and hydrocarbons were formulated with polyvinyl chloride to form a series of blends labelled B–D. Blend A was similarly formulated but with a commercial plasticizer. Each blend was made up of 50 parts of the plasticizer, 100 parts of the resin, 2 parts of a barium-cadmium salt stabilizer and 0.5 part of stearic acid, all parts by weight. Each blend was milled 8 minutes at 310° F. on a 2-roll mill. After mill mixing, the stock was sheeted off and molded under 1500 p.s.i.g. pressure at 330° F. to yield test pads measuring approximately 6 x 6 x 0.075 inch. Test film measuring approximately 6 x 6 x 0.010 inch was similarly prepared.

Plasticizer compatibility was determined by noting any exudation from the test compounds.

The mechanical properties of the 0.075 inch test pads were determined by standard techniques. Tensile properties were measured on dumbell samples with an Instron machine pulling at a rate of 20 inches/minute with a chart speed of 10 inches/minute and a gauge length of 2 inches. Hardness was measured with a Share A durometer by taking a 15-second reading.

Carbon black volatility was measured by placing circular samples, 2 inches in diameter, of the film in coarse grade activated carbon and heating at 70° C. for 24 hours. After removal of the samples and reconditioning, volatility was calculated as the percent weight loss of the sample.

Oil dye stain tests were conducted by painting kerosene solutions of 0.5% Oil Yellow dye and 1% Oil Brown dye onto 0.010 inch plasticized film samples. The painted samples were then allowed to stand for thirty minutes. After the waiting period excess dye was wiped off the samples with naphtha and the remaining stain was rated visually. Asphalt stain tests were conducted by smearing asphalt onto 0.075 inch samples. The samples were then warmed in a 50° C. oven for 24 hours. Following the warming period, excess asphalt was wiped off the sample with naphtha and the remaining stain was rated visually.

The properties including stain resistance of the blends containing the complex esters and hydrocarbons of this invention are compared with blend A containing dioctyl phthalate, a widely used plasticizer in the floor-tile industry, in Table I below.

TABLE I

|  | Blend A | Blend B | Blend C | Blend D |
|---|---|---|---|---|
|  | Plasticizer | | | |
|  | Dioctyl phthalate | Ditolyl-methane-methylol acetate | Ester-hydro-carbon mixture | (α-xylyl-ditolyl-methane hydrocarbon |
| Compatibility | Compatible | Compatible | Compatible | Incompatible |
| Mechanical Properties: | | | | |
| Ultimate Tensile Strength, p.s.i. | 2,905 | 3,340 | 3,125 | |
| Ultimate Elongation, percent | 255 | 240 | 215 | |
| 100% Modulus, p.s.i. | 1,940 | 2,345 | 2,855 | |
| Shore A Hardness | 86 | 86 | 94 | |
| Volatility: Carbon Black, Percent Loss | 1.4 | 9.7 | 5.2 | |
| Staining: [a] | | | | |
| Yellow Dye | 10 | 6 | 3 | |
| Brown Dye | 10 | 3 | 2 | |
| Asphalt | 8 | 5 | 2 | |

[a] Code: 0—no staining to 10—heavy staining.

The comparison set forth in Table I above indicates that both the pure dinuclear ester, ditolylmethanemethylol acetate, and its mixture with principally the trinuclear ester, ($\alpha$-xylyl)-ditolylmethanemethylol acetate, and the trinuclear hydrocarbon, ($\alpha$-xylyl)-ditolylmethane, as prepared in Example 1, are compatible with polyvinyl chloride. Hydrocarbons, such as ($\alpha$-xylyl)-ditolylmethane, which were produced in the condensation reaction, are not compatible when used alone as plasticizers.

The mechanical property measurements indicate that the mixture of esters and hydrocarbons is somewhat less efficient than the dioctyl phthalate; i.e., a higher concentration of plasticizer is required to yield a compound of similar mechanical properties. The pure ester, however, approximates dioctyl phthalate in efficiency. Lastly, the staining data demonstrates that when the individual ester and the ester-hydrocarbon mixture are used as plasticizers, the resulting compositions exhibit much greater resistance to staining.

Example 3

To illustrate the properties of the plasticizers of this invention in a specific end-use, which particularly points out its superior stain resistance, a series of floor-tile compounds were prepared and tested. A mixture of the plasticizer, the polyvinyl chloride resin, an epoxidized soybean oil, a barium-cadmium salt stabilizer, calcium carbonate filler and titanium dioxide pigment was blended in a Hobart mixer for 5 minutes. Exact formulations, which contain varying concentrations of plasticizer, are set forth in Table II below. The blend was milled and molded into 6 x 6 x 0.075 inch tile compounds by techniques similar to those employed with the clear compounds above.

The mechanical properties of the tile were determined by standard techniques. Hardness was measured with a Shore D Durometer by taking a 15-second reading. Olsen stiffness was measured with a 6 inch-pound Tinius Olsen machine on 1 x 6 inch samples.

Traffic staining of the test tile was determined as $\Delta Y$, the change in yellowness as measured by a reflectometer, of the samples after being subjected to a severe traffic test. This test was conducted by installing a test panel of the tile samples in a heavy traffic area for a test period of five weeks. The panel received no maintenance, other than scrubbing with soapy water before measurement of the final yellowness of the samples. A comparison of the mechanical and staining properties of blends containing the plasticizers of this invention (F–I) and a blend of the standard dioctyl phthalate (E) are shown in Table II.

As shown by the above comparison, floor tile compounds of good mechanical properties can be made from both the pure dinuclear ester and its mixture with the trinuclear ester and trinuclear hydrocarbon.

The comparison also shows that both the above ester and the ester-hydrocarbon mixture are superior to dioctyl phthalate in resistance to traffic staining. At equal stiffness and hardness values, as set forth in Table III below, the ester and the ester-hydrocarbon mixture exhibit nearly 20% improvement over dioctyl phthalate.

TABLE III

| Plasticizer | Concentration at Equal Stiffness and Hardness, Vol. percent | Staining percent Improvement Over (DOP[1]) |
| --- | --- | --- |
| Dioctyl Phthalate (DOP) | 15 | |
| Ditolylmethanemethylol Acetate | 15 | 19 |
| Ester Hydrocarbon Mixture (Example #1) | 17 | 18 |

[1] Percent Improvement of X over $DOP = \frac{\Delta Y_{DOP} - \Delta Y_X \cdot 100}{\Delta Y_{DOP}}$.

Example 4

Following essentially the same reaction procedure of Example 1, toluene, paraformaldehyde, and glacial acetic acid was condensed using sulfuric acid catalysis to obtain a similar reaction mixture containing varying amounts of di- and trinuclear hydrocarbons and di- and trinuclear esters, as well as mononuclear products and heavy bottoms product containing compounds having at least four aromatic groups per molecule. This total mixture was washed three times with 25 vol. percent water. Following the washing operation, the reaction mixture was stripped at 20 mm. of mercury and at an overhead vapor temperature of 170° C. leaving a product that contained about 15% of the 2-ring hydrocarbon, 15% of the 3-ring hydrocarbon, 30% of the 2-ring ester, 10% of the 3-ring ester, and 30% of products containing four or more aromatic groups.

A portion of the above-prepared plasticizer product and dioctyl phthalate, a widely used commercial plasticizer, were formulated with polyvinyl chloride to produce the blends labeled J and K. Each blend was made up to 50 parts of plasticizer, 100 parts of resin, 2 parts of a barium-cadmium salt stabilizer and 0.5 parts of stearic acid, all parts by weight. Each blend was milled 8 minutes at 310° F. on a 2-roll mill. After mill mixing, the stock was sheeted off and molded under 1500 p.s.i.g. pressure at 330° F. to yield test pads measuring approximately

TABLE II

| | Blend | | | | |
| --- | --- | --- | --- | --- | --- |
| | E | F | G | H | I |
| Formulation (Parts per 100 Wt. Parts of Resin): | | | | | |
| Polyvinyl Chloride | 100 | 100 | 100 | 100 | 100 |
| Epoxidized Soybean Oil | 4.0 | 4.0 | 4.0 | 4.0 | 4.0 |
| Stabilizer | 3.1 | 3.1 | 3.1 | 3.1 | 3.1 |
| Calcium Carbonate | 183.7 | 183.7 | 196.8 | 183.7 | 196.8 |
| Titanium Dioxide | 7.4 | 7.4 | 7.9 | 7.4 | 7.9 |
| Dioctyl Phthalate (Vol. percent) | 25.5 (15.0) | | | | |
| Ditolylmethanemethylol [a] Acetate (Vol. percent) | | 27.5 (15.0) | 35.4 (18.0) | | |
| Ester-Hydrocarbon Mixture [a] (Vol. percent) (Mixture of Exp. #1) | | | | 27.8 (15.0) | 35.7 (18.0) |
| Properties: | | | | | |
| Shore D Hardness | 69 | 69 | 56 | 75 | 65 |
| Olsen Stiffness (p.s.i.×10⁻⁴) | 6.0 | 5.2 | 2.0 | 13.0 | 4.2 |
| Staining ($\Delta Y$) | 5.7 | 4.6 | 5.4 | 4.4 | 4.9 |

[a] Acetylated with acetyl chloride to convert trace amounts of alcohols to their corresponding esters.

6 x 6 x 0.075 inches. Test film measuring 6 x 6 x 0.010 inches was similarly prepared.

The mechanical properties and strain resistance properties of the plasticized samples were determined using the methods set forth in Example 2. The results of the test are set forth in Table IV below.

TABLE IV

|  | J | K |
|---|---|---|
| Mechanical Properties: |  |  |
| Ultimate Tensile (p.s.i.) | 2,680 | 3,085 |
| Ultimate Elongation (percent) | 275 | 225 |
| 100% Modulus (p.s.i.) | 1,695 | 2,520 |
| Shore A Hardness | 84 | 89 |
| Volatility: Carbon Black (Percent Loss) | 1.1 | 6.7 |
| Staining: [a] |  |  |
| Yellow Oil Dye | 10 | 3 |
| Brown Oil Dye | 10 | 2 |
| Asphalt | 8 | 1 |

[a] Code: 0—no staining to 10—heavy staining.

The results of the above tests indicate that the condensation products of the present invention are highly efficient plasticizers for polyvinyl chloride. A comparison of the test data also indicates that the instant multi-component plasticizer composition is superior to dioctyl phthalate in resistance to staining. An additional mixture containing approximately 50% 2-ring hydrocarbon was also found to perform well as a stain-resistant plasticizer.

Example 5

Modified esters of the dinuclear acetate were prepared by transesterification of the acetate ester or by hydrolysis to the alcohol followed by direct esterification. The isobutyrate and the benzoate monoesters, and the adipate diester of ditolylmethanemethylol were thus prepared. These esters also exhibit good plasticizing and superior anti-staining performance.

Similarly, employing the preparation technique outlined in Example 1, ditolylmethanemethylol isobutyrate, ditolylmethanemethylol benzoate or bis(ditolylmethanemethylol) adipate can be produced by substituting either isobutyric acid, benzoic acid, or adipic acid for the acetic acid specified in the example.

It will be understood that the foregoing examples have been given merely for purposes of illustration and that modifications of the present invention are possible without departing from the scope of the appended claims.

What is claimed is:

1. A mixture having utility as a plasticizer consisting essentially of at least 20 wt. percent of monoesters having the formulae:

(1)

$(R_1)_n-\bigcirc-CH_2-\bigcirc\begin{matrix}-CH_2OCOR_2\\-(R_1)_n\end{matrix}$ and (2)

$(R_1)_n-\bigcirc-CH_2-\bigcirc\begin{matrix}-R_3\\-(R_1)_n\end{matrix}-CH_2-\bigcirc\begin{matrix}-R_4\\-(R_1)_n\end{matrix}$ and a hydrocarbon having the formulae:

(3)

$(R_1)_n-\bigcirc-CH_2-\bigcirc\begin{matrix}-CH_2\\-(R_1)_n\end{matrix}-\bigcirc-(R_1)_n$ wherein $n$ varies from 0 to 4, $R_3$ and $R_4$ are selected from the group consisting of hydrogen and $-CH_2OCOR_2$ radicals and $R_1$ and $R_2$ are $C_1$ to $C_8$ hydrocarbon radicals.

2. The composition of claim 1 wherein $n$ is one and $R_1$ and $R_2$ are methyl groups.

3. A mixture having utility as a plasticizer consisting essentially of at least 20 wt. percent of monoesters having the formulae:

$(R_1)_n-\bigcirc-CH_2-\bigcirc\begin{matrix}-CH_2OCOR_2\\-(R_1)_n\end{matrix}$ $(R_1)_n-\bigcirc-CH_2-\bigcirc\begin{matrix}-R_3\\-(R_1)_n\end{matrix}-CH_2-\bigcirc\begin{matrix}-R_4\\-(R_1)_n\end{matrix}$ and a hydrocarbon having the formula:

$(R_1)_n-\bigcirc-CH_2-\bigcirc-(R_1)_n$ $(R_1)_n-\bigcirc-CH_2-\bigcirc\begin{matrix}-CH_2\\-(R_1)_n\end{matrix}-\bigcirc-(R_1)_n$ wherein $n$ varies from 0 to 4, $R_3$ and $R_4$ are selected from the group consisting of hydrogen and $-CH_2OCOR_2$ radicals and $R_1$ and $R_2$ are $C_1$ to $C_8$ hydrocarbon radicals.

4. The composition of claim 3 wherein $n$ is one and $R_1$ and $R_2$ are methyl groups.

5. A mixture having utility as a plastilizer consisting essentially of at least 20 wt. percent of monoester having the formula:

$(R_1)_n-\bigcirc-CH_2-\bigcirc\begin{matrix}-CH_2OCOR_2\\-(R_1)_n\end{matrix}$ and a hydrocarbon having the formula:

$(R_1)_n-\bigcirc-CH_2-\bigcirc\begin{matrix}-CH_2\\-(R_1)_n\end{matrix}-\bigcirc-(R_1)_n$ wherein $n$ varies from 0 to 4, and $R_1$ and $R_2$ are $C_1$ to $C_8$ hydrocarbon radicals.

6. The composition of claim 5 wherein $n$ is one and $R_1$ and $R_2$ are methyl groups.

7. A mixture having utility as a plasticizer consisting essentially of at least 20 wt. percent of monoester having the formula:

$(R_1)_n-\bigcirc-CH_2-\bigcirc\begin{matrix}-R_3\\-(R_1)\end{matrix}-CH_2-\bigcirc-R_4\,-(R_1)_n$ and a hydrocarbon having the formula:

$(R_1)_n-\bigcirc-CH_2-\bigcirc\begin{matrix}-CH_2\\-(R_1)_n\end{matrix}-\bigcirc-(R_1)_n$ wherein $n$ varies from 0 to 4, $R_3$ and $R_4$ are selected from the group consisting of hydrogen and $-CH_2OCOR_2$ radicals, and $R_1$ and $R_2$ are $C_1$ to $C_{20}$ hydrocarbon radicals.

8. The composition of claim 7 wherein $n$ is one and $R_1$ and $R_2$ are methyl groups.

References Cited

UNITED STATES PATENTS

| | | | |
|---|---|---|---|
| 2,761,884 | 9/1956 | Koorevaar. | |
| 2,833,816 | 5/1958 | Saffer | 260—668 X |
| 3,290,360 | 12/1966 | Tveten | 260—491 |
| 3,290,361 | 12/1966 | Tveten et al. | 260—494 |
| 3,303,212 | 2/1967 | Tveten | 260—494 |

JULIUS FROME, *Primary Examiner.*

T. MORRIS, *Assistant Examiner.*

U.S. Cl. X.R.

260—31.2